Oct. 15, 1957 T. STUTZ 2,810,015
APPARATUS FOR TELEVISING MOTION PICTURE FILM
Filed Jan. 25, 1955
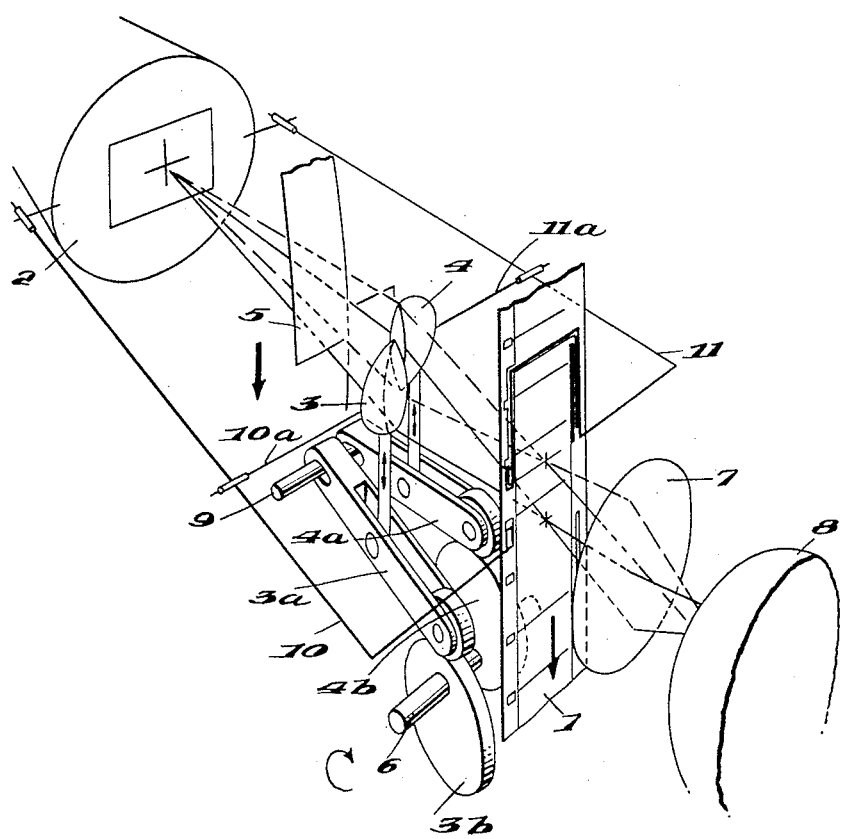
INVENTOR
Theo Stutz
BY Pierce, Scheffler & Parker
ATTORNEYS United States Patent Office 2,810,015
Patented Oct. 15, 1957

2,810,015

APPARATUS FOR TELEVISING MOTION PICTURE FILM

Theo Stutz, Elmira Heights, N. Y., assignor to Gesellschaft zur Förderung der Forchung an der Eidg. Techn. Hochschule, Zurich, Switzerland Application January 25, 1955, Serial No. 483,939

Claims priority, application Switzerland January 28, 1954

3 Claims. (Cl. 178—7.2)

This invention relates in general to an apparatus for the projection of motion picture films, and more particularly to an apparatus for the projection of continuously travelling motion picture films which are to be televised.

The televising of films raises certain problems which do not arise when slides are being transmitted or live objects are televised, since the mode of operation and rates of picture production of the two media are inherently different. The only possible solution, which will make different phase standards of film and television cameras compatible for non-storing television camera systems, is the employment of the so-called optical compensation of the film movement. Under this principal consecutive pictures are continuously faded into each other, offering a still picture to the television scanning system while the film is actually moving forward. Because of this and other reasons shutterless film projectors with optical compensation of the film movement are being used for television scanning at the present time, a method developed to a high degree of quality reproduction by Mechau as early as 1928. If such projectors are used, the speed of the film movement need not be synchronized with the television scanning device.

However, there exists a need to accomplish the optical compensation by a method which, in comparison with known solutions, allows an appreciably simpler construction of the necessary mechanism and provides an improvement in the quality of the picture.

The standard film feeding apparatus in use today consists of the drum type of mechanism having sprockets which cooperate with holes in the film. This type of mechanism has the disadvantage that as the length of the film changes due to shrinkage or stretching, the rate of feeding varies, and for sound films, the resulting sound reproduction is quite unsatisfactory. To overcome the aforementioned disadvantages, my invention was developed.

Objects of the present invention are to provide a method of and apparatus for compensating optically the movement of continuously passing film, especially for the purpose of televising of films. An object is to provide a method of projecting films by two optical systems which are independently movable and mechanically synchronized in their movements with the picture frames of the film. A further object is to provide film projection apparatus of the dual optical system type in which the mechanism for displacing the optical systems alternately in the direction of and opposite to the direction of film travel also controls the advance of the film, whereby errors which might arise from shrinkage of the film are eliminated. An object is to provide shutterless projection apparatus which includes two movable optical systems and a mechanism for continuously transporting a film and for displacing the optical systems alternately in the direction of and opposite to the direction of travel of the film for intervals during which single picture frames of the film are projected.

More praticularly, an object is to provide shutterless projection appartus of the type in which two optical systems are alternately displaced in the direction of and opposite to the direction of film travel, and wherein claws for advancing the film are actuated by the same mechanisms which displace the optical systems.

These and other objects and the advantages of the invention will be apparent from the following specification when taken with the accompanying drawing in which the single figure is a schematic perspective view of apparatus operating in accordance with the method of the invention.

In the drawing, reference numeral 1 identifies the motion picture film which is continuously moved, although not necessarily at a uniform rate, in the direction of the arrow and reference numeral 2 identifies the reference plan. The film and reference plane are associated with lenses 3 and 4 which are identical with each other and each of which is one-half of a standard symmetrical lens. The lenses are supported for independent movement in such manner that the optical centers of the lenses move along the same line parallel to the direction of film 1. A rotating diaphragm 5 is positioned between the reference plane 2 and the lenses which are supported on levers 3a, 4a, having rollers bearing on cams 3b, 4b, respectively, mounted on a shaft 6. At the side of the film opposite lenses 3 and 4 is a condenser lens 7 and a photo-cathode 8. The levers 3a, 4a are journalled on a shaft 9 which is not moved during the operation of the projection apparatus but which may be adjusted by means, not shown, in a horizontal direction, i. e. perpendicular to the plane of travel of the film.

The mechanism for transporting the film 1 comprises pull-down devices of known type consisting of levers 10 and 11 connected by bars 10a, 11a to the lenses 3 and 4, respectively, and pivotally supported at their inner ends adjacent the reference plane 2 to constitute lever arms of such ratio that their outer ends displace the film in proper timing with the movement of lenses 3 and 4. Each lever 10 and 11 has a claw hinged thereon and of such width as to occupy slightly less than one-half of a sprocket hole. In known manner the claws are pressed lightly against the film by weak springs and enter the sprocket holes to move the film only when travelling downwardly. When moving in the opposite direction, the claws slide over the film along the line of the sprocket holes.

In the illustrated embodiment, the reference plane 2 is the screen of a cathode ray tube, and an electron beam is displaced over the screen in known manner to trace a raster of desired pattern. The travelling light spot of the raster is the light source which is projected upon the film by the lenses 3 or 4, and the light beam passes through the film and condenser lens 7 to fall upon the photo-cathode 8. The quantity of light arriving at the photo-cathode is a measure of the brightness of the point of the film corresponding to the position of the electron beam within the raster at that instant, and the emitted current is therefore a proper video signal.

The lenses 3 and 4 are moved in opposite directions by cams 3b and 4b on shaft 6 and the diaphragm 5 is rotated in synchronism with shaft 6 by means, not shown, to block transmission of light by the lenses in alternation during their displacements in a direction opposite that of the film travel. The cams 3b, 4b are so shaped that the return movement of a lens takes place somewhat faster than its displacement in the same direction as the film, and there is a certain interval during which two adjacent picture frames are being projected on reference plane 2 by the lenses. During this time period the images are faded into each other by diaphragm 5, but the total brightness of the image remains constant since diaphragm 5 is moved to release just so much of the effective area of the lens to be faded in, as it masks from the effective area of the lens to be blocked off. This is accomplished by a suitable drive of diaphragm 5, for instance by arranging the diaphragm parts on a relatively large rotating disk or drum, which turns about its horizontal axis perpendicular to the plane of the film and in front of the lenses. For this fading-in process it is necessary that the displacements of the lenses and the claws conform exactly to the distance between two picture frames of the film. Since this distance depends upon the state of shrinkage of the film, the above-mentioned adjustment of shaft 9 is provided to determine the amplitudes of these movements. This adjustment will alter the leverage between the cams and the lenses, and this will set the amplitude of the movement of the film in accordance with the particular shrinkage of the film being projected.

If such arrangement is used, the film need not move uniformly, that is it need not be driven at an always constant speed. The power required for the drive of the lenses becomes smaller with a suitable deviation from a uniform drive of the film.

When the film is driven at an approximately uniform speed, the movement of the lenses is not in phase. Therefore, vibration may be transmitted to the entire system, unless counterweights are mounted on the shaft 6 in appropriate positions.

The movements of the optical systems and the film remain continuously in synchronism since both are displaced by the same mechanism or, to state it differently, the movement of the film is controlled frame by frame in accordance with the displacement of the optical systems to project stationary images of successive frames upon a reference plane.

The above described apparatus represents only one practical example of the method of the invention. Obviously, its application is not limited to a scanning system by electron beam, and its application outside of the television field is quite feasible. It is also possible to displace the optical axes of the two optical systems by the movement of two mirrors or two prisms. Under certain circumstances it would be advantageous also to move the tips of the claws positively in a direction perpendicular to the film to effect engagement with the perforations, as for example by the use of separate cams, such movement being known in and employed by many 16-mm. projectors. By using two separate photocathodes, one for each lens 3 or 4 respectively, it is also possible to effect the change from one lens to the other electrically instead of mechanically by means of the diaphragm 5.

Thus it is apparent that my invention provides a uniform film feeding mechanism which overcomes the undesirable uneven rate of film feeding presented by the standard drum and socket type film feeding apparatus.

I claim:

1. A mechanism for feeding motion picture film for televising purposes, comprising a cathrode ray tube screen which produces a light source; an optical compensating system dividing said source into two separate light beams, said compensating system including two lenses adjacently arranged in a plane parallel to the plane of said screen, and a movable diaphragm between said lenses and said screen; a film strip illuminated by said separate light beams from said compensating system, said film strip being movable in a plane parallel to the plane of said screen and having standard sprocket holes therein; a photo-cathode tube on the other side of said film from said optical compensating system to receive said light beam; and means for independently reciprocating said lenses in the plane parallel to the plane of the screen and simultaneously feeding said film strip longitudinally in a direction parallel to the axis of reciprocation of said lenses, said means including a lever secured adjacent each side of the optical system, said levers being pivotally secured at one end adjacent said cathode ray screen to permit oscillatory movement of said levers in planes normal to the plane of said screen, claw means secured to the other ends of said levers, said claw means being adapted to cooperate with the holes of said film strip on the movement of said levers in the direction of film feed, and means connecting each of said levers intermediate its ends to the adjacent associated lens, whereby uniform feeding of the film is produced in synchronism with the respective movements of the optical compensating system.

2. A mechanism as defined in claim 1 wherein said means for independently reciprocating said lenses includes a rotary shaft the longitudinal axis of which is parallel to the plane of said screen and perpendicular to the direction of reciprocation of said lenses, cams secured to said rotary shaft, and follower means associated with said cams and secured to said lenses.

3. A mechanism as defined in claim 2 wherein said follower means comprises a stationary shaft spaced from and parallel to said rotary shaft, levers pivotally secured to said stationary shaft and adapted to oscillate in planes normal to the plane of said screen, roller followers at the other ends of said levers cooperating with said cams, and means connecting said levers intermediate their ends to said lenses; and means associated with said follower means for adjusting the distance between said stationary shaft and said rotary shaft to vary the amplitudes of movement of said lenses and simultaneously the rate of feed of said film strip.

References Cited in the file of this patent

UNITED STATES PATENTS

| 1,336,996 | Boixeda | Apr. 13, 1920 |

FOREIGN PATENTS

| 601,223 | France | Nov. 26, 1925 |
| 518,730 | Germany | Feb. 19, 1931 |
| 432,635 | Great Britian | July 22, 1935 |